(12) United States Patent
Gstöhl et al.

(10) Patent No.: US 10,427,706 B2
(45) Date of Patent: Oct. 1, 2019

(54) STEERING COLUMN WITH A BEARING SEAT WHICH CAN BE MOUNTED IN A FLEXIBLE MANNER

(71) Applicants: THYSSENKRUPP PRESTA AG, Eschen (LI); thyssenkrupp AG, Essen (DE)

(72) Inventors: Eric Gstöhl, Eschen (LI); Sven Hausknecht, Dornbirn (AT); Stefan-Hermann Loos, Heerbrugg (CH); Frank Pasch, Buchs (CH); Christian Geissler, Buchs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 180 days.

(21) Appl. No.: 15/541,884

(22) PCT Filed: Sep. 22, 2015

(86) PCT No.: PCT/EP2015/071746
§ 371 (c)(1),
(2) Date: Jul. 6, 2017

(87) PCT Pub. No.: WO2016/110337
PCT Pub. Date: Jul. 14, 2016

(65) Prior Publication Data
US 2018/0001922 A1    Jan. 4, 2018

(30) Foreign Application Priority Data
Jan. 8, 2015    (DE) .................. 10 2015 000 027

(51) Int. Cl.
*B62D 1/19*    (2006.01)
*B62D 1/16*    (2006.01)
*B62D 1/185*   (2006.01)

(52) U.S. Cl.
CPC ............... *B62D 1/192* (2013.01); *B62D 1/16* (2013.01); *B62D 1/185* (2013.01)

(58) Field of Classification Search
CPC ........... B62D 1/192; B62D 1/16; B62D 1/185
See application file for complete search history.

(56) References Cited

U.S. PATENT DOCUMENTS 2,282,161 A * 5/1942 Brauer .................. B61F 5/305
                                              105/224.1
2,635,019 A * 4/1953 Cochran ................ D01H 7/86
                                              384/536

(Continued)

FOREIGN PATENT DOCUMENTS

CN    101934813 A    1/2011
CN    202574340 U    12/2012

(Continued)

OTHER PUBLICATIONS

English translation of International Search Report issued in PCT/EP2015/071746, dated Dec. 3, 2015 (dated Dec. 11, 2015).

*Primary Examiner* — Ruth Ilan
*Assistant Examiner* — Timothy Wilhelm
(74) *Attorney, Agent, or Firm* — thyssenkrupp North America, Inc.

(57) ABSTRACT

A steering column may comprise a casing tube and a steering spindle that is mounted in the casing tube so as to be rotatable about a longitudinal axis of the casing tube. Because the casing tube may be an outer casing tube that has a non-circular inner cross section and because an adaptor may be manufactured from metal as an extruded part and may comprise an outer circumferential configuration that is compatible with an inner cross section of the casing tube and an interior annular bearing seat, the adaptor can be inserted into the outer casing tube and can be fastened there.

11 Claims, 3 Drawing Sheets

(56) References Cited

U.S. PATENT DOCUMENTS

| | | | | |
|---|---|---|---|---|
| 3,709,057 | A * | 1/1973 | Kitzner | B62D 1/192 74/492 |
| 3,832,911 | A * | 9/1974 | Daniel | B62D 1/192 74/492 |
| 3,890,854 | A * | 6/1975 | Pitner | F16C 27/066 384/582 |
| 4,142,423 | A * | 3/1979 | Ikawa | B60R 22/28 188/374 |
| 4,614,444 | A * | 9/1986 | Hines | B62D 1/16 384/138 |
| 5,306,032 | A * | 4/1994 | Hoblingre | B62D 1/189 280/775 |
| 5,606,892 | A * | 3/1997 | Hedderly | B62D 1/16 280/775 |
| 5,669,718 | A * | 9/1997 | Sakairi | B62D 1/16 384/215 |
| 5,737,971 | A * | 4/1998 | Riefe | B62D 1/181 280/775 |
| 6,000,490 | A * | 12/1999 | Easton | B62D 1/16 180/402 |
| 6,425,605 | B1 * | 7/2002 | Cholakon | B62D 1/185 280/775 |
| 6,474,875 | B1 * | 11/2002 | Waseda | B62D 1/16 384/536 |
| 6,637,945 | B2 * | 10/2003 | Cartwright | B62D 1/16 384/584 |
| 6,749,342 | B1 * | 6/2004 | Leins | D04B 15/48 384/536 |
| 6,925,714 | B2 * | 8/2005 | Toth | B21K 1/063 29/508 |
| 6,942,386 | B2 * | 9/2005 | Weissflog | B62D 1/185 384/47 |
| 7,354,069 | B2 * | 4/2008 | Yamada | B62D 1/184 280/775 |
| 7,441,956 | B2 * | 10/2008 | Koeniger | H02K 7/06 384/43 |
| 7,490,855 | B2 * | 2/2009 | Inayoshi | B62D 1/192 280/777 |
| 7,637,667 | B1 * | 12/2009 | Schaub | B62D 1/16 384/536 |
| 7,726,691 | B2 * | 6/2010 | Yamada | B62D 1/184 280/775 |
| 7,753,800 | B2 * | 7/2010 | Tokioka | B62D 1/185 384/54 |
| 7,896,557 | B2 * | 3/2011 | Nakano | F01L 1/047 29/898.062 |
| 8,398,496 | B2 * | 3/2013 | Bahr | B62D 1/16 384/10 |
| 8,827,821 | B2 * | 9/2014 | Buzzard | B62D 1/20 464/167 |
| 8,960,045 | B2 * | 2/2015 | Ishige | B62D 1/16 280/775 |
| 9,010,215 | B2 * | 4/2015 | Rietzler | B29C 59/043 74/493 |
| 9,126,622 | B2 * | 9/2015 | Hebenstreit | B62D 1/20 |
| 9,233,706 | B2 * | 1/2016 | Schnitzer | B62D 1/16 |
| 9,327,756 | B2 * | 5/2016 | Rauber | B62D 1/181 |
| 9,469,330 | B2 * | 10/2016 | Tanaka | B62D 1/184 |
| 9,566,996 | B2 * | 2/2017 | Wilkes | B62D 1/192 |
| 9,677,605 | B2 * | 6/2017 | Cheon | F16C 19/527 |
| 9,944,309 | B2 * | 4/2018 | Matsuno | B62D 1/19 |
| 10,040,472 | B2 * | 8/2018 | Sulser | B62D 1/16 |
| 10,077,065 | B2 * | 9/2018 | Hebenstreit | B60Q 5/003 |
| 10,137,925 | B2 * | 11/2018 | Appleyard | B62D 1/185 |
| 2003/0154815 | A1 * | 8/2003 | Heiml | B21C 37/0803 74/492 |
| 2005/0077716 | A1 * | 4/2005 | Urista | B62D 1/192 280/777 |
| 2007/0245845 | A1 * | 10/2007 | Ridgway | B62D 1/189 74/493 |
| 2009/0013817 | A1 | 1/2009 | Schnitzer | |
| 2015/0246689 | A1 * | 9/2015 | Kornmayer | B62D 1/16 74/493 |
| 2016/0052536 | A1 * | 2/2016 | Nicolussi | B62D 1/16 384/441 |
| 2016/0114827 | A1 * | 4/2016 | Tanaka | B62D 1/185 74/493 |

FOREIGN PATENT DOCUMENTS

| | | |
|---|---|---|
| EP | 1550598 A | 7/2005 |
| JP | 2011-042262 A | 3/2011 |
| KR | 20080071323 A | 8/2008 |
| WO | 2015018781 A | 2/2015 |

* cited by examiner

STEERING COLUMN WITH A BEARING SEAT WHICH CAN BE MOUNTED IN A FLEXIBLE MANNER

CROSS REFERENCE TO RELATED APPLICATIONS

This application is a U.S. National Stage Entry of International Patent Application Serial Number PCT/EP2015/071746, filed Sep. 22, 2015, which claims priority to German Patent Application No. DE 10 2015 000 027.6 filed Jan. 8, 2015, the entire contents of both of which are incorporated herein by reference.

FIELD

The present disclosure generally relates to steering columns and, more particularly, to steering columns that can be mounted in a flexible manner.

BACKGROUND

Steering columns have diverse functions in motor vehicles. They firstly serve for fastening the steering wheel and for mounting the steering shaft or steering spindle on the vehicle body. They also serve for fastening add-on parts, such as, for example, an anti-theft means or operator control elements. The steering columns are sometimes also adjustable mechanically or electrically in the axial direction and vertical direction in order to be able to adapt the position of the steering wheel to the requirements of the driver. Finally, steering columns are also intended to yield in a controlled manner in the event of an impact of the vehicle against an obstacle, in order to absorb impact energy of the driver against the steering wheel and thereby to reduce the risk of injury for the driver. Along with all of these requirements, it is also required that steering columns take up little construction space, have a low weight and operate without play and noise.

In addition, steering columns are intended to be as reasonably priced as possible.

The document EP 1 550 598 A1 presents a steering column in which the rigidity of the casing unit is increased by targeted enlargement or expansion of the cross section of the casing tube manufactured from sheet metal. The mounting of the steering spindle is designed here as a rolling bearing at its lower end which lies at the front in the direction of travel and therefore faces away from the steering column. The bearing seat of the rolling bearing is formed in a spacer or adaptor which is manufactured from resin or a rubber-elastic material and is intended to absorb vibrations.

The fastening of the adaptor to the lower end of the casing unit constitutes a restriction which may lead to undesirable effects. Furthermore, such adaptors are affected by tolerances, in particular in this combination of materials, and therefore have an influence on the rigidity and natural frequency of the steering column in an unforeseeable manner. However, in particular in the event of a crash, good support of the steering spindle has to be ensured in order to prevent uncontrolled movements which could harm the driver.

DETAILED DESCRIPTION

Figure 1:
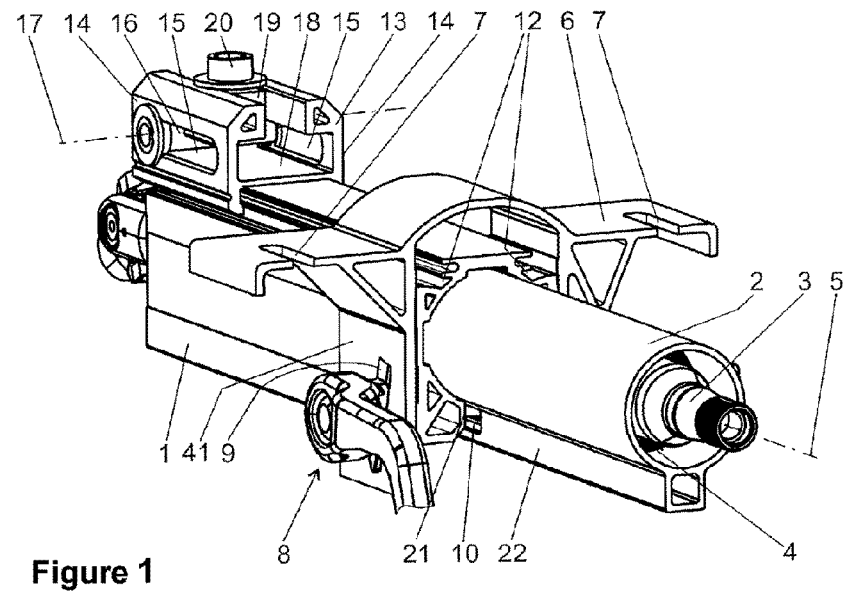
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide a steering column for a motor vehicle, in which a bearing is mounted in an improved manner.

A steering column for a motor vehicle is proposed comprising a casing tube and a steering spindle which is mounted in at least one bearing in the casing tube so as to be rotatable about a longitudinal axis, wherein the bearing comprises an outer ring which, for the mounting, interacts with an inner bearing surface which is arranged on the steering spindle, wherein the outer ring fits in an adaptor, and comprising fastening elements for fastening the steering column on the vehicle body. According to the invention, the casing tube has an at least partially non-circular inner cross section, and the adaptor comprises an outer circumferential configuration which is compatible with the inner cross section of the casing tube and an interior annular bearing seat, wherein the inner non-circular cross section of the casing tube that is compatible with the adaptor extends over a length of at least 3 times the bearing width of the bearing.

The bearing width refers to the size of the bearing in the direction of the longitudinal axis. In the case of a rolling bearing, the bearing width generally corresponds with the axial width of the outer ring which is accommodated in a bearing seat.

The arrangement according to the invention provides the possibility of accommodating a bearing in a casing tube having an at least partially non-circular inner cross section and of fixing said bearing at an advantageous position with respect to the longitudinal axis without complicated and cost-intensive mechanical machining. The longitudinal position can be selected here firstly with regard to natural vibrations in order to suppress resonances and secondly can be fixed particularly firmly in order to prevent a movement of the bearing in the casing tube in the event of a crash. "Non-circular" should be understood as meaning any cross-sectional shapes which do not have a circular cross section. The inner non-circular cross section of the casing tube that is compatible with the adaptor should thus be understood as meaning that said casing tube is compatible within the scope of the assembly, and therefore the adaptor can be introduced into the inner non-circular cross section and can preferably be fixed in a form-fitting connection with regard to a rotation about the longitudinal axis and at a predefined longitudinal position, for example by caulking.

The bearing can be designed both as a plain bearing, with an outer ring designed as a bearing bushing, or as a rolling bearing. Such a rolling bearing comprises at least one rolling body, an outer ring and preferably an inner ring. The rolling bodies are preferably designed as balls which are arranged between the outer ring and the inner ring.

The casing tube preferably has a substantially uniform cross section in the direction of the longitudinal axis, and therefore the adaptor can be positioned at various points within the casing tube, depending on the design of the steering column. This means that at least the inner surface of the casing tube has, perpendicular to the longitudinal axis, a cross section which is compatible with the adaptor and extends over at least 60% of the length of the casing tube in the direction of the longitudinal axis. The same cross section preferably extends over the entire length of the casing tube. A casing tube with a substantially uniform cross section can be particularly advantageously produced from an extruded profile. The extruded profile semi-finished product here is cut to the appropriate length such that blanks of the casing tube are produced. The corresponding functional elements, for example bores and elongated holes, are introduced subsequently.

In particular, the extruded profile, which has a non-circular contour in an inner surface, can then have the adaptor having an outer, compatible, non-circular contour pushed therein, said adaptor being positioned in the desired longitudinal position and subsequently being fixed. At the same time, it is possible to use the same components for steering columns having different component lengths.

In order to form the casing tube, exclusively bores or elongated holes and also plane surfaces are preferably introduced on the extruded profile by remachining. The recesses serve preferably as functional elements, for example in order to form elongated adjustment holes and/or bores for the passage of the tensioning pin or for receiving further structural elements. Plane surfaces can be provided especially in those regions of the outer surfaces of the casing tube which are provided as contact surfaces with pairing with other structural elements. Good pairing is promoted by said plane surfaces.

In particular, the adaptor can have a circular ring-shaped basic shape and at least one lug integrally formed on the outside. After introduction of the adaptor into the compatible, inner, non-circular cross section of the casing tube, this configuration provides a connection to the casing tube in a manner fixed against rotation with a form fit.

The adaptor is preferably produced as an extruded component. It is conceivable and possible for the adaptor to be produced as a die-cast component from aluminum or plastic.

The adaptor is preferably rotationally symmetrical, and therefore the adaptor is insertable into the casing tube in a plurality of equivalent positions. This simplifies the assembly.

The adaptor is preferably introduced into the casing tube with an excess size and/or is caulked thereto and/or connected thereto in an integrally bonded manner, or fixed with a screw. Excess size should be understood as meaning a transition fit or a slight interference fit, and therefore the adaptor can be introduced into the inner cross section with little force. The caulking can be undertaken by deforming the casing tube, and therefore the adaptor is axially secured with a form fit. An integrally bonded fixing of the adaptor in the casing tube, for example by an adhesive, is likewise possible. Furthermore, the adaptor can likewise be secured by a screw which is screwed into the casing from the outside and securely clamps the adaptor, for example by what is referred to as a grub screw or by a self-tapping screw, for example a sheet metal screw. These fastening methods make it possible to ensure simple axial fixing of the adaptor in the casing tube.

If the adaptor is fixed in the casing tube by caulking or screwing, the advantage is afforded that the adaptor can be introduced into the casing tube with ample play. Said play between the adaptor and casing tube is subsequently compensated for by the caulking or screwing. As a result, after the caulking or screwing, the adaptor fits in the casing tube without play. Since the adaptor has been introduced into the casing tube with play and has only been fixed in the casing tube in the final position, the bearing is free of forced states. The running properties can therefore be improved and the wear minimized.

The inner cross section of the casing tube can be bounded by an inner circumferential surface which comprises at least two partially cylindrical surfaces and rectangular grooves located in between. As a result, the adaptor can be held securely and without play. For this purpose, the adaptor can engage by means of the at least one lug in at least one rectangular groove.

The casing tube preferably has a longitudinal slot. An inner casing tube which is arranged displaceably in the casing tube can therefore be fixed by a tensioning apparatus. The tensioning apparatus acts on the casing tube and can be switched between a fixing position and a release position, wherein, in the release position, the inner casing tube is displaceable in relation to the casing tube and, in the fixing position, the inner casing tube is fixed in the casing tube by narrowing of the longitudinal slot in comparison to the release position.

For this purpose, the partially cylindrical surfaces preferably bound a tubular guide into which an inner casing tube is inserted so as to be fixed against rotation and in an axially displaceable manner.

It is finally preferred if the grooves and the longitudinal slot are distributed at an angular distance of 90°, 120° or 180° about the longitudinal axis of the casing tube and form an extension of the otherwise circular cross section. For the angular distance of 90°, the extension is of cross-shaped design, and is of star-shaped design for 120°; for 180°, the two extensions lie radially opposite with respect to the longitudinal axis. This results in advantageous possibilities of configuring rotationally fixed connections with components inside the casing tube.

This steering column affords the advantage of cost-effective production and the possibility of accommodating the bearing in a simple manner without additional machining of the casing tube.

FIG. 1 illustrates a steering column with a casing tube 1 and an inner casing tube 2 in a perspective view. The interior of the inner casing tube bears an upper steering spindle 3 which is mounted in a rolling bearing 4 so as to be rotatable about a longitudinal axis 5. The longitudinal axis 5 defines an axial direction of the steering column arrangement, in which the inner casing tube 2 is displaceable in relation to the casing tube 1 in the manner of a telescope. In this embodiment, the casing tube 1 may also be referred to as outer casing tube.

The casing tube 1 is held in a bracket 6, which may also be referred to as fastening element and which is provided with cutouts 7 for fastening the bracket 6 to a vehicle body and is furthermore provided with two side cheeks 41 which are parallel and are spaced apart and between which the casing tube 1 extends. The bracket 6 furthermore has a tensioning apparatus 8 which passes through the bracket 6 transversely with respect to the longitudinal axis 5 and which permits a height adjustment of the casing tube 1 in relation to the bracket 6 and an axial adjustment of the inner casing tube 2 in relation to the casing tube 1. For this purpose, the bracket 6 is provided with guide slots 9, and the inner casing tube 2 is provided with a guide slot 10.

The casing tube 1 furthermore bears a lower steering shaft or steering spindle 11 which is mounted in a rolling bearing (not visible here) within the casing tube 1. The upper steering spindle 3 and the lower steering spindle 11 are connected to each other in a manner fixed against rotation, but so as to be telescopic, as is customary in the prior art. The lower steering spindle 11 is connected in a manner fixed against rotation to a cardanic joint.

The upper side of the casing tube 1 has longitudinal grooves 12 which face away from each other and in which a supporting element 13 engages. In the manner of a slide in the direction of the longitudinal axis 5 in the grooves, the supporting element 13 is placed onto the casing tube 1 and fastened there. For this purpose, the supporting element 13 engages in the grooves 12 in the manner of a clamp and engages around the upper, outer portion of the casing tube 1 located between the grooves 12. The fastening can be undertaken by caulking or adhesive bonding. The supporting element 13 can likewise be pressed with excess size into the grooves 12. The supporting element 13 furthermore has side walls 14 which, in the mounted state according to FIG. 1, extend upward from the grooves 12 and which are oriented with their flat sides parallel to the longitudinal axis 5 and with their short end sides transversely with respect to the longitudinal axis 5. The sides 14 are each provided with an elongate recess 15, the longitudinal axis of which is oriented parallel to the longitudinal axis 5. A tubular bushing 16 which defines a pivot axis 17 is arranged in the recesses 15 transversely with respect to the longitudinal axis 5. After assembly of the steering column arrangement in a motor vehicle, the pivot axis 17 is oriented substantially transversely with respect to the direction of travel and horizontally. The pivot axis 17 serves as a bearing axis for the vertical pivoting of the steering column during operation.

Between the sides 14, a T-groove 18 which extends parallel to the longitudinal axis is provided in the supporting element 13. The inner, free cross section of the T-groove 18 bears a sliding block 19 which is fastenable in the guide element by a threaded screw 20.

On its lower side, which also points downward upon fitting into a vehicle, the casing tube 1 comprises a longitudinal slot 21 in which a downwardly pointing web 22, which is integrally formed on the lower side of the inner casing tube 2 in the longitudinal direction of the longitudinal axis 5, is guided axially. During operation, the inner casing tube 2 is displaceable in the casing tube 1 for the purpose of the axial adjustment of the steering column as long as the tensioning apparatus 8 has been released and is therefore in a release position. When the tensioning apparatus 8 is tensioned, which is also called the fixing position, the casing tube 1 is contracted in the region of the longitudinal slot 21, as a result of which the longitudinal slot is narrowed in comparison to the release position, and the inner casing tube 2 is clamped there in order to fix the selected axial position. The casing tube 1 therefore acts as a clamp. A width of the longitudinal slot 21 is reduced when the tensioning apparatus 8 is tensioned. The width corresponds here to the extent of the longitudinal slot 21 in the direction of the tensioning pin 27.

The inner casing tube 2 furthermore has a circular inner cross section which can serve directly as a seat for a rolling bearing 4. The rolling bearing 4 is preferably inserted into the inner casing tube 2 with a press fit and supports the driver-side end of the upper steering spindle 3 in a rotatable manner.

Figure 2:
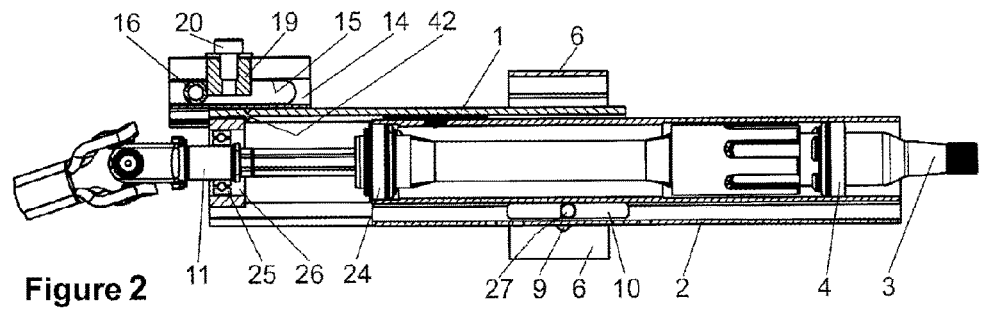
FIG. 2 is a longitudinal sectional view taken from the side illustrating the steering column of FIG. 1.

FIG. 2 illustrates the steering column from FIG. 1 in a longitudinal section from the side.

FIG. 2 shows the inner construction of the steering column, which comprises a second rolling bearing 24 for the mounting of that end of the upper steering spindle 3 which faces away from the steering wheel. The second rolling bearing 24 is inserted in the same manner as the first rolling bearing 4 into the inner casing tube 2. It is furthermore illustrated how the lower steering spindle 11 engages in the upper steering spindle 3. The two structural elements each have a non-circular, for example clover-leaf-shaped cross section matching each other without play, and therefore the structural elements are guided in each other fixed against rotation but in an axially displaceable and telescopic manner. Owing to this guidance, the lower steering spindle 11 requires only one rolling bearing for the rotatable mounting. The rolling bearing 25 is inserted by means of an adaptor 26 into the casing tube 1 at the free end thereof through which the inner casing tube 2 does not pass. The adaptor 26 is secured in the casing tube 1 against displacement in the direction of the longitudinal axis 5 by means of a caulking 42. Said caulking 42 is formed by local material deformation of the casing tube 1. The deformation has taken place here from the outside.

FIG. 2 also illustrates the relative position of the inner casing tube 2 in relation to the casing tube 1. The position illustrated here corresponds to a central position within the adjustment range for longitudinal adjustment in the direction of the longitudinal axis 5, said adjustment range being available to the driver for adapting the steering wheel distance. This can be seen by the fact that a tensioning pin 27 of the tensioning apparatus 8, which is otherwise not visible here, lies centrally in the guide slot 10. Furthermore, in the position according to FIG. 2, the bushing 16 is positioned in the recess at an end remote from the steering wheel. The sliding block is fastened in the T-groove 18 in a manner lying directly against the bushing 16, and therefore the bushing 16 is secured between the end of the recess 15 and the sliding block 19.

FIG. 2 therefore shows a central setting of the steering column during a normal operating state.

Figure 3:
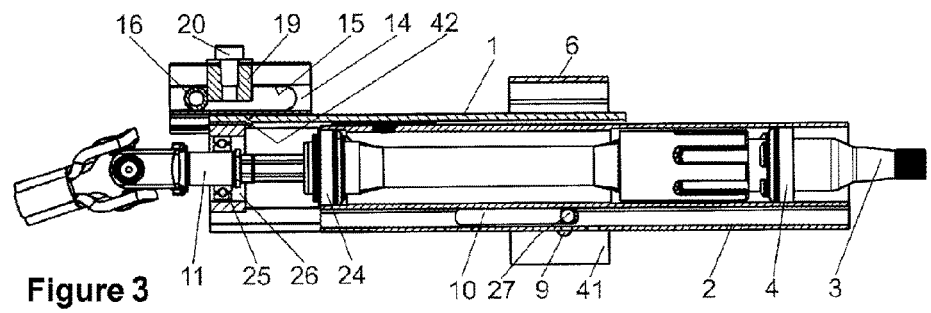
FIG. 3 is a longitudinal sectional view taken from the side illustrating the steering column of FIG. 1 in a different adjustment position.

In FIG. 3, which essentially corresponds to FIG. 2, the inner casing tube 2 has been displaced to the left in relation to the casing tube 1 into the casing tube 1 such that the tensioning pin 27 lies against that end of the guide slot 10 which is in the vicinity of the steering wheel. This position corresponds to an axial adjustment by the driver, in which the steering wheel is at the greatest possible distance from the driver in the normal driving mode.

Figure 4:
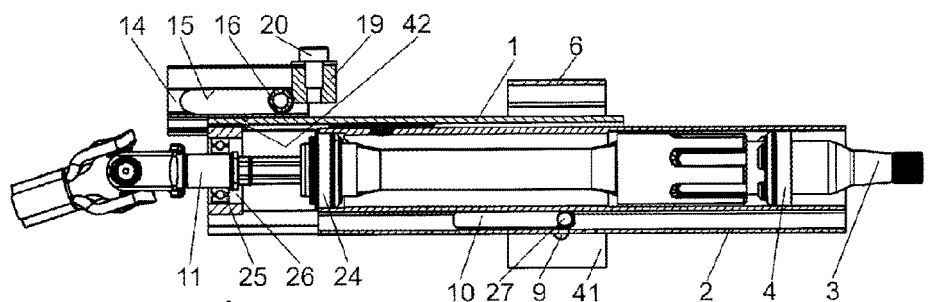
FIG. 4 is a longitudinal sectional view taken from the side illustrating the steering column of FIGS. 2-3 in a pushed-together position following an impact.

FIG. 4 shows the steering column after what is referred to as the crash situation, i.e. after a frontal impact of the vehicle against an obstacle, in which the driver impacts against the steering wheel. Starting from the position according to FIG. 3, the assembly consisting of the casing tubes 1 and 2, the bracket 6 and the supporting element 13 is displaced to the left, i.e. forward in the direction of travel of the vehicle. The bracket slides here in the region of the cutouts 7 out of its fastenings to the vehicle body. The amount of the displacement corresponds to the length of the recess 15, which can be seen by the fact that the bushing 16 mounted on the vehicle body now lies against that end of the recess 15 which is in the vicinity of the steering wheel. During the impact, the supporting element 13 is therefore also displaced against the bushing 16 under the influence of the force which arises and acts at least with one component in the direction of the longitudinal axis 5. The sliding block 19 slides here along the T-groove 18. The clamping force produced by means of the threaded screw 20 causes friction of the sliding block 19 within the T-groove 18, said friction leading to energy absorption. Said energy absorption is desirable since it damps the impact of the driver against the steering wheel and thereby reduces the risk of injury in a crash.

Figure 5:
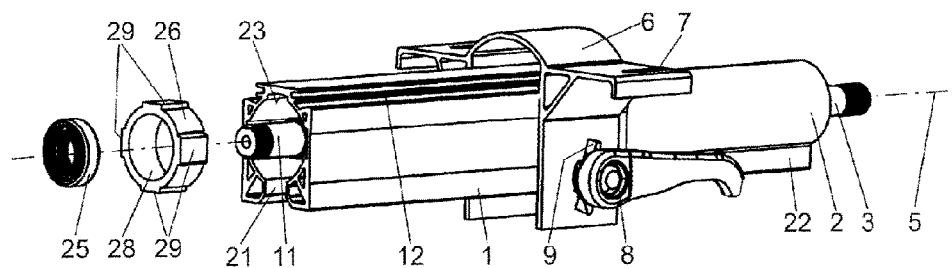
FIG. 5 is a perspective view of the steering column of FIG. 1 taken from the side facing away from the steering wheel.

FIG. 5 shows the steering column in a perspective view of the mounting of the lower steering spindle 11 in the casing tube 1, wherein the mounting is present here in an exploded illustration. The casing tube, as already mentioned above, is manufactured as an extruded part and therefore has a substantially uniform cross section over its longitudinal extent in the direction of the longitudinal axis 5, said cross section being substantially maintained over the entire length with respect to the longitudinal axis 5 without relatively large sections having been cut from the original blank by means of a cutting operation. In particular, the interior is bounded by an inner circumferential surface which has four partially cylindrical surfaces and three rectangular grooves 23 located in between. The partially cylindrical surfaces form an approximately circular-cylindrical, tubular guide into which the inner casing tube 2 is inserted. The grooves 23 and the longitudinal slot 21 arranged at the bottom are distributed at an angular distance of 90° and form a cross-shaped extension of the otherwise circular cross section.

The adaptor 26 which has a compatible outer circumferential surface with lugs 29 and also a circular-cylindrical, annular bearing seat 28 on the inside is inserted into said clear opening of the casing tube 1. The bearing seat 28 serves for receiving the rolling bearing 25. The inner ring of the rolling bearing 25 in turn accommodates the bearing seat of the lower steering spindle 11. The rolling bearing 25 therefore supports the lower steering spindle 11 in the adaptor 26, said steering spindle being fixed in turn in the casing tube 1. On account of the formation of the casing tube 1 and of the adaptor 26 as an extruded part, the adaptor 26 can be positioned at virtually any point within the casing tube 1. The mounting can therefore be realized for different embodiments, for example of differing length, using identical parts. During the assembly of the steering column, the adaptor, either with or without preassembled bearing, is positioned at the desired point in the casing tube and is subsequently fixed in the casing tube by screwing and/or caulking and/or pressing in and/or adhesive bonding.

Figure 6:
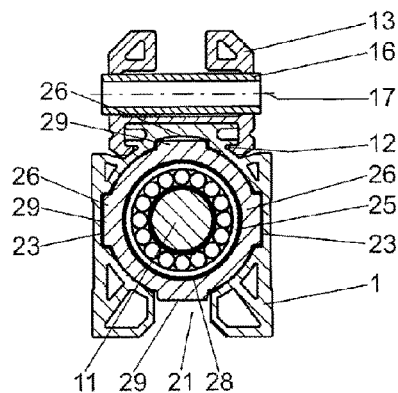
FIG. 6 is a cross sectional view through an example steering column in the region of a rolling bearing.

FIG. 6 shows a cross section in the region of the above-described mounting. It can be seen that the adaptor 26 with the lugs 29 lies in the grooves 23 of the casing tube 1 in a manner fixed against rotation and can be fixed there in the casing tube, for example by screwing and/or caulking and/or pressing in and/or adhesive bonding.

Figure 7:
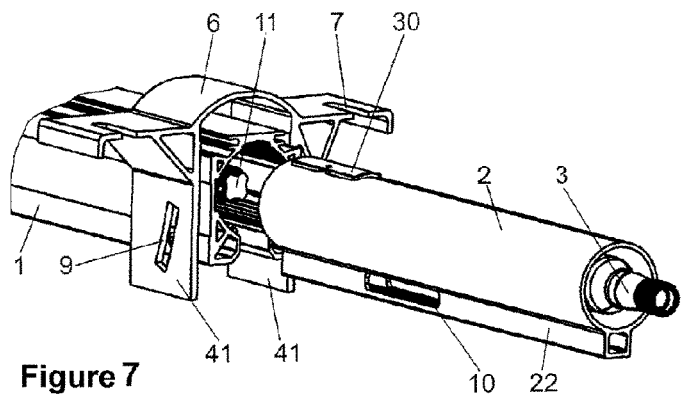
FIG. 7 is a perspective detail view of an example steering column arrangement with a separated inner casing tube.

FIG. 7 shows a perspective view of the steering column, in which the inner casing tube 2 has been pulled out of the casing tube 1. The inner casing tube 2 is formed with its web 22, which is integrally formed at the bottom, in such a manner that said casing tube fits into the casing tube 1 in a manner fixed against rotation solely because of the shape. Furthermore, the rear upper side of the inner casing tube 2 bears a rotation lock 30. The web comprises the guide slot 10 through which the tensioning pin 17 (not illustrated here) of the tensioning apparatus 8 passes. The guide slot 9 formed in the bracket 6 corresponds to the movement path of the tensioning pin 27 in relation to the bracket 6 during an adjustment operation in the vertical direction of the steering column in the motor vehicle.

Figure 8:
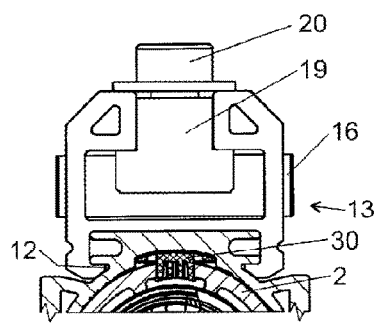
FIG. 8 is a cross sectional view of an example steering column with an example supporting element disposed thereon.

The guidance of the inner casing tube 2 in the casing tube 1 is shown in a cross section in FIG. 8. At the same time, FIG. 8 shows the supporting element 13 in an end view. The upper side of the inner casing tube 2 bears the rotation lock 30 which engages in the upper groove 23 of the casing tube 1. The rotation lock 30 can also be produced from a self-lubricating plastic. The supporting element 13 with the sliding block 19 arranged in a frictionally locking manner therein and the bushing 16 has already been described above.

Figure 9:
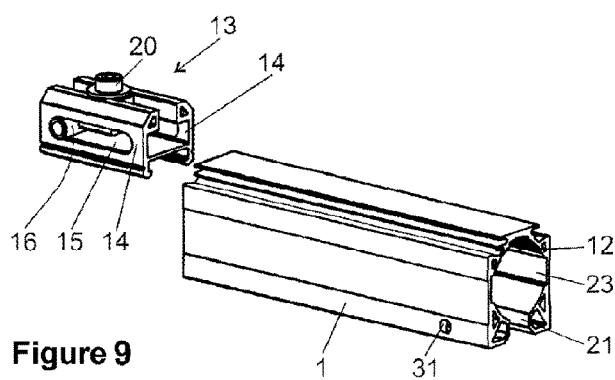
FIG. 9 is a perspective view of an example casing tube with an example supporting element separated.

FIG. 9 shows the casing tube 1 with the supporting element 13 in a separate illustration before the supporting element 13 is placed onto the casing tube 1. This illustration shows the position of a bore 31 which accommodates the tensioning pin 27 (not illustrated here).

Figure 10:
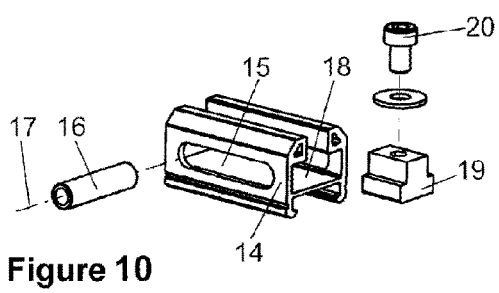
FIG. 10 is an exploded view of an example supporting element with additional components.

FIG. 10 shows the supporting element 13 with the sliding block 19 and the bushing 16 in an exploded illustration.

Figure 11:
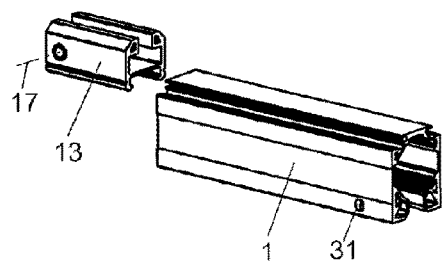
FIG. 11 is a perspective view corresponding to FIG. 9 illustrating a pivot axis.

FIG. 11 shows the casing tube 1 with the supporting element 13 without sliding block and bushing in an illustration as in FIG. 9.

Figure 12:
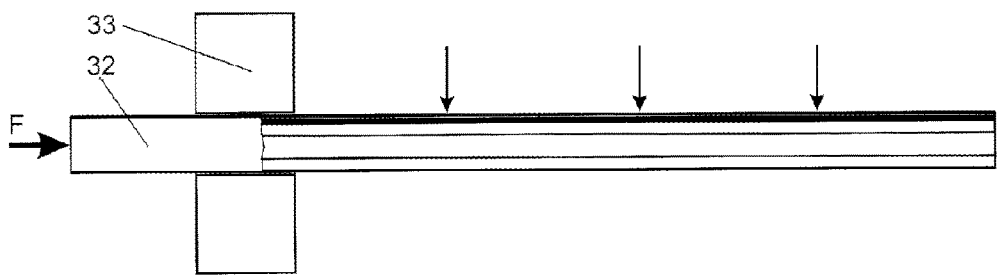
FIG. 12 is a schematic view of a manufacturing process showing formation of a casing tube by extrusion with indicated separating points for separating an extruded profile into individual blanks for casing tubes.

FIG. 12 shows a production method of the casing tube 1. From the left side of the figure, a material strand 32, for example composed of an aluminum alloy or magnesium alloy, is pressed by a pressing force F, preferably at increased temperature, through a mold 33. The molded part which arises is then a blank and has the cross-sectional shape of the casing tube 1. For the separation into individual workpieces, the molded part is separated at the points indicated by arrows, for example by sawing. The length of the workpieces can be varied by selection of the separating points.

Figure 13:
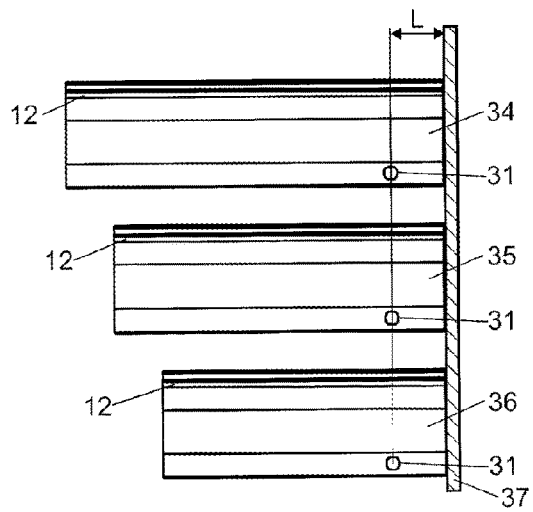
FIG. 13 is a side sectional view of casing tubes of different length showing a standard position of a functional region.

FIG. 13 shows how a long blank 34, a medium length blank 35 and a short blank 36 are processed by provision of functional elements. In this case, the functional elements are restricted to the bore 31 for receiving the tensioning pin 27. In the three blanks 34, 35 and 36, said bore 31 is provided at the same distance L from the right end surface of the respective blank, shown here by a contact plate 37. As has already been described above, all of the other features of the casing tube 1 have been produced solely by the extrusion mold. This applies, for example, to the grooves 12 and to the other features (not visible in FIG. 13) of the inner cross section. Various component lengths are realized solely by cutting the blanks to length. The functional elements can be provided in the same device since only the front end surface is used as a reference plane.

Figure 14:
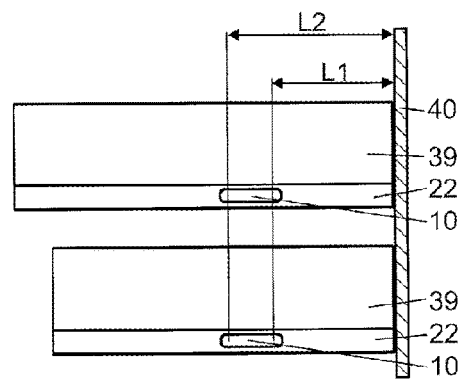
FIG. 14 is a side sectional view similar to FIG. 13 illustrating two inner casing tubes in which a position of a functional region is likewise illustrated.

FIG. 14 shows how a long blank 38 and a short blank 39 are processed by provision of functional elements in each case to form an inner casing tube 2. In this case, the functional elements are restricted to the guide slot 10 which is introduced into the web 22. In the two blanks 38 and 39, said guide slot 10 is provided in the same region, measured from L1 to L2, from the right end side of the respective blank, shown here by a contact plate 40. All other features of the inner casing tube 2, as have already been described above, have been produced solely by the extrusion mold. This applies, for example, to the web 22 and to the other features (not visible in FIG. 14) of the inner cross section.

Various component lengths are realized solely by cutting the blanks to length. The functional elements can be provided in the same device since only the front end surface is used as a reference plane.

Thus, in a standard setting, components for steering columns of differing lengths and therefore for different vehicle platforms can be manufactured from the same extruded part in a particularly simple and cost-effective manner.

Figure 15:
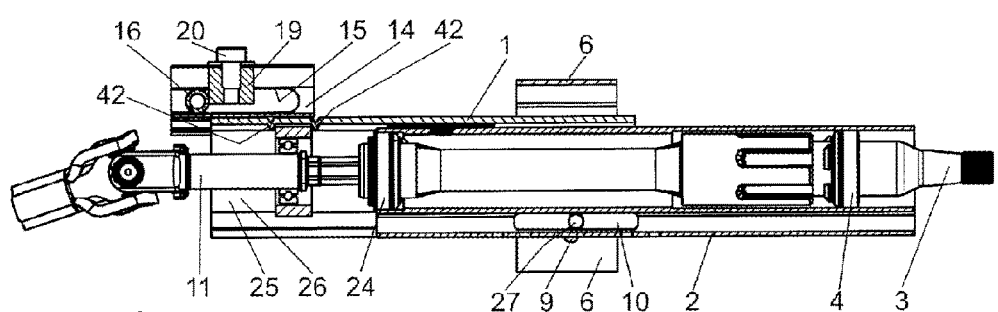
FIG. 15 is a sectional view of an example steering column with an alternative arrangement of an adaptor in a casing tube.

FIG. 15 shows an alternative construction of a steering column similar to FIGS. 1 to 10, which steering column comprises a second rolling bearing 24 for the mounting of that end of the upper steering spindle 3 which faces away from the steering wheel. The second rolling bearing 24 is inserted in the same manner as the first rolling bearing 4 into the inner casing tube 1. It is furthermore illustrated how the lower steering spindle 11 engages in the upper steering spindle 3. The two structural elements each have a non-circular, for example clover-leaf-shaped cross section matching each other without play such that they are guided one inside the other fixed against rotation, but in an axially displaceable and telescopic manner. Owing to this guidance, the lower steering spindle 11 requires only one rolling bearing for the rotatable mounting. The rolling bearing 25 is inserted by means of the adaptor 26 into the casing tube 1 through which the inner casing tube 2 does not pass. In comparison to the first variant embodiment in FIGS. 1 to 10, the adaptor 26 here is not arranged at the free end of the casing tube 1, but rather is introduced into the casing tube 1 at a lower point from the end facing away from the steering wheel. The adaptor 26 is secured in the casing tube 1 against displacement in the direction of the longitudinal axis 5 by means of the caulkings 42. Said caulkings 42 are formed by local material deformation of the casing tube 1. The deformation has taken place here from the outside.

By means of the design according to the invention of the casing tube 1 and of the adaptor 26, a variable and cost-effective accommodating of the bearing in the casing tube 1 of a steering column can be ensured, and therefore said variable configuration can be used for different steering columns for different vehicles.

To the extent usable, the individual features which are illustrated in the individual exemplary embodiments can be combined with one another and/or replaced without departing from the scope of the invention.

LIST OF REFERENCE SIGNS

1. Casing tube
2. Inner casing tube
3. Steering spindle
4. Rolling bearing, longitudinal axis
5. Bracket
6. Cutouts of tensioning apparatus
7. Guide slots
8. Guide slot
9. Steering spindle
10. Grooves
11. Supporting element
12. Side walls
13. Recess
14. Tubular bushing
15. Pivot axis
16. T groove
17. Sliding block
18. Threaded screw
19. Longitudinal slot
20. Web
21. Groove
22. Rolling bearing
23. Rolling bearing
24. Adaptor
25. Tensioning pin
26. Bearing seat
27. Lug
28. Rotation lock
29. Bore
30. Material strand
31. Mold
32. Blank
33. Blank
34. Blank
35. Contact plate
36. Blank
37. Blank
38. Contact plate
39. Side cheek
40. Caulking

What is claimed is:

1. A steering column for a motor vehicle, the steering column comprising:
   a casing tube that extends along a longitudinal axis and has an at least partially non-circular inner cross section;
   a steering spindle that is mounted in at least one bearing in the casing tube so as to be rotatable about the longitudinal axis, wherein the at least one bearing comprises an outer ring that for purposes of mounting interacts with an inner bearing surface disposed on the steering spindle, wherein the outer ring fits in an adapter comprising an outer circumferential configuration that is compatible with the at least partially non-circular inner cross section of the casing tube and an interior annular bearing seat, wherein the at least partially non-circular inner cross section of the casing tube that is compatible with the adapter extends over a length of at least three times a bearing width of the at least one bearing; and fastening elements for fastening the steering column to the motor vehicle, wherein the inner cross section of the casing tube is bounded by an inner circumferential surface, the inner cross section comprising at least two partially cylindrical surfaces between which rectangular grooves are disposed, and wherein the at least two partially cylindrical surfaces bound a tubular guide into which an inner casing tube is inserted for rotation therewith and in an axially displaceable manner.

2. The steering column of claim 1 wherein the inner cross section that is compatible with the adapter extends over at least 60% of a length of the casing tube in a direction of the longitudinal axis.

3. The steering column of claim 1 wherein the adapter has a circular ring shape and includes a lug disposed on an outside of the adapter.

4. The steering column of claim 3 wherein the lug is disposed integrally on the outside of the adapter.

5. The steering column of claim 1 wherein the adapter is rotationally symmetrical.

6. The steering column of claim 1 wherein at least one of an outer diameter of the adapter exceeds a diameter of an inner surface of the casing tube;
the adapter is caulked to the casing tube; or
the adapter is connected to the casing tube in an integrally bonded manner.

7. The steering column of claim 1 wherein the casing tube comprises a longitudinal slot.

8. The steering column of claim 1 wherein by way of a lug the adapter engages in one of the rectangular grooves.

9. The steering column of claim 1 wherein the casing tube comprises a longitudinal slot, wherein the rectangular grooves and the longitudinal slot are distributed at an angular distance of 90° and form an extension of the inner cross section that is otherwise generally round.

10. The steering column of claim 1 wherein the casing tube comprises a longitudinal slot, wherein the rectangular grooves and the longitudinal slot are distributed at an angular distance of 120° and form an extension of the inner cross section that is otherwise generally round.

11. The steering column of claim 1 wherein the casing tube comprises a longitudinal slot, wherein the rectangular grooves and the longitudinal slot are distributed at an angular distance of 180° and form an extension of the inner cross section that is otherwise generally round.

* * * * *